(12) United States Patent
Konopka

(10) Patent No.: US 8,414,685 B2
(45) Date of Patent: Apr. 9, 2013

(54) SYSTEM AND METHOD FOR REMOVAL OF DISSOLVED GASES IN MAKEUP WATER OF A WATER-COOLED NUCLEAR REACTOR

(75) Inventor: George G. Konopka, East McKeesport, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 97 days.

(21) Appl. No.: 12/877,145

(22) Filed: Sep. 8, 2010

(65) Prior Publication Data

US 2012/0055330 A1 Mar. 8, 2012

(51) Int. Cl.
  *B01D 53/22* (2006.01)
  *B01D 19/00* (2006.01)
  *C02F 1/20* (2006.01)

(52) U.S. Cl.
  USPC ....... 95/46; 95/1; 95/45; 96/6; 96/7; 376/310; 376/313

(58) Field of Classification Search ............... 95/45, 46, 95/47, 54, 1; 96/4, 6, 7; 376/310, 313
  See application file for complete search history.

(56) References Cited

U.S. PATENT DOCUMENTS

| | | | |
|---|---|---|---|
| 3,788,068 A * | 1/1974 | Heitmann et al. | 60/665 |
| 3,789,577 A * | 2/1974 | Gramer et al. | 376/310 |
| 4,225,390 A * | 9/1980 | Brown et al. | 376/328 |
| 4,383,969 A * | 5/1983 | Bleier | 376/313 |
| 4,533,514 A | 8/1985 | Yamamoto et al. | |
| 6,026,138 A * | 2/2000 | Hartmann et al. | 376/299 |
| 6,456,683 B1 * | 9/2002 | Izumi et al. | 376/313 |
| 6,955,702 B2 | 10/2005 | Kubokawa et al. | |
| 6,955,706 B2 * | 10/2005 | Varrin et al. | 95/46 |
| 2007/0127619 A1 * | 6/2007 | Hosokawa et al. | 376/417 |
| 2009/0290676 A1 * | 11/2009 | Meintker | 376/367 |

FOREIGN PATENT DOCUMENTS

| WO | WO 2009/135163 | * | 11/2009 |
|---|---|---|---|
| WO | WO 2009/135163 A2 | | 11/2009 |

* cited by examiner

*Primary Examiner* — Jason M Greene

(57) ABSTRACT

The present invention relates to a system and method for removing dissolved gas from makeup water in a water-cooled nuclear reactor. The present invention includes a storage tank for containing the makeup water that includes the dissolved gas, a membrane system positioned downstream of the storage tank to at least partially remove the dissolved gas from the makeup water; and a transport mechanism to transfer the makeup water from an outlet of the membrane system for use in the water-cooled nuclear reactor. The dissolved gas can include at least one of dissolved oxygen, dissolved nitrogen, dissolved argon and mixtures thereof.

18 Claims, 2 Drawing Sheets

STANDBY ALIGNMENT

SUPPLY DELIVERY ALIGNMENT

SYSTEM AND METHOD FOR REMOVAL OF DISSOLVED GASES IN MAKEUP WATER OF A WATER-COOLED NUCLEAR REACTOR

FIELD OF THE INVENTION

The present invention relates to water-cooled nuclear reactors and, in particular, the makeup water system of water-cooled nuclear reactors. The present invention further relates to a system and method for at least partially separating and removing dissolved gases in makeup water.

BACKGROUND OF THE INVENTION

In water-cooled nuclear reactors, such as pressurized water reactors ("PWRs"), water is continuously fed into the core of the reactor. The water is continuously replenished from a makeup water source, such as, a Primary Makeup Water ("PMW") System. The water may contain at least one chemical, such as, boron which is used to control the neutron flux inside the reactor core.

The PMW System typically includes a primary water storage tank for containing the makeup water. The makeup water in the primary water storage tank is usually covered (e.g., with a rubber bladder) to prevent air from entering the storage tank. However, it has been found that even with a covering, there is still an amount of air that can enter the storage tank. It is desired to prevent air from entering the storage tank because air contains gases, such as, nitrogen, oxygen and argon, which can dissolve in the water. The makeup water including the dissolved gases is then ultimately fed into the reactor core and, related systems and components. This can be a concern because dissolved gases, such as, oxygen, are known sources of corrosion in water systems. It is known in the art to add chemicals, such as, hydrazine, to the makeup water to control the dissolved oxygen level therein. However, there are disadvantages associated with the addition of hydrazine. For example, hydrazine can breakdown and, as a result, increase the amount of dissolved nitrogen in the makeup water. Further, a nitrogen blanket may be used in the primary water storage tank, which can also increase the amount of dissolved nitrogen in the makeup water. It has been found that when the makeup water is ultimately fed into the reactor core, the dissolved nitrogen in the makeup water can increase the production of carbon-14. The nitrogen forms carbon-14 when it absorbs neutrons in the core of the reactor. It is known that carbon-14 is an environmental contaminant and therefore, it is desirable to minimize or preclude its formation. Additionally, argon has undesirable effects similar to nitrogen and therefore, it is preferred to remove at least one of dissolved oxygen, nitrogen and argon from the makeup water.

Thus, there is a need to design and develop improved systems and methods for controlling, e.g., reducing, minimizing or removing, the level of dissolved gases in makeup water that is ultimately fed into the core of a water-cooled nuclear reactor or related systems. Further, it is desired to provide systems and methods that can be employed on-demand such that the PMW System can be in a standby or non-operational mode when not needed and can be initiated or started-up in response to the occurrence of a situation or event which requires makeup water to be supplied.

SUMMARY OF THE INVENTION

An aspect of the present invention provides a system for at least partially removing dissolved gas from makeup water for use in a water-cooled nuclear reactor. The system includes a storage tank having a discharge. The storage tank contains the makeup water including the dissolved gas. The system further includes a membrane system having an inlet and an outlet. The membrane system is positioned downstream of the discharge of the storage tank to receive the makeup water and to at least partially remove the dissolved gas from the makeup water. The system also includes a mechanism to transport the makeup water from the outlet of the membrane system for use in the water-cooled nuclear reactor.

The dissolved gas can include at least one dissolved gas selected from dissolved oxygen, dissolved nitrogen, dissolved argon and mixtures thereof. The dissolved gas can be present in the makeup water as a result of air saturation.

Another aspect of the present invention provides a method for at least partially removing dissolved gas from makeup water in a water-cooled nuclear reactor. The method includes providing a storage tank to contain the makeup water that includes the dissolved gas, discharging the makeup water from an outlet of the storage tank to an inlet of a membrane system, passing the makeup water through the membrane system, at least partially removing the dissolved gas from the makeup water in the membrane system, and transporting the makeup water from an outlet of the membrane system to an end user selected from the group consisting of components and/or systems in the water-cooled nuclear reactor.

BRIEF DESCRIPTION OF THE DRAWINGS

The invention as set forth in the claims will become more apparent from the following detailed description of certain preferred practices thereof illustrated, by way of example only, and the accompanying drawings, wherein:

DETAILED DESCRIPTION OF THE INVENTION

Figure 1:
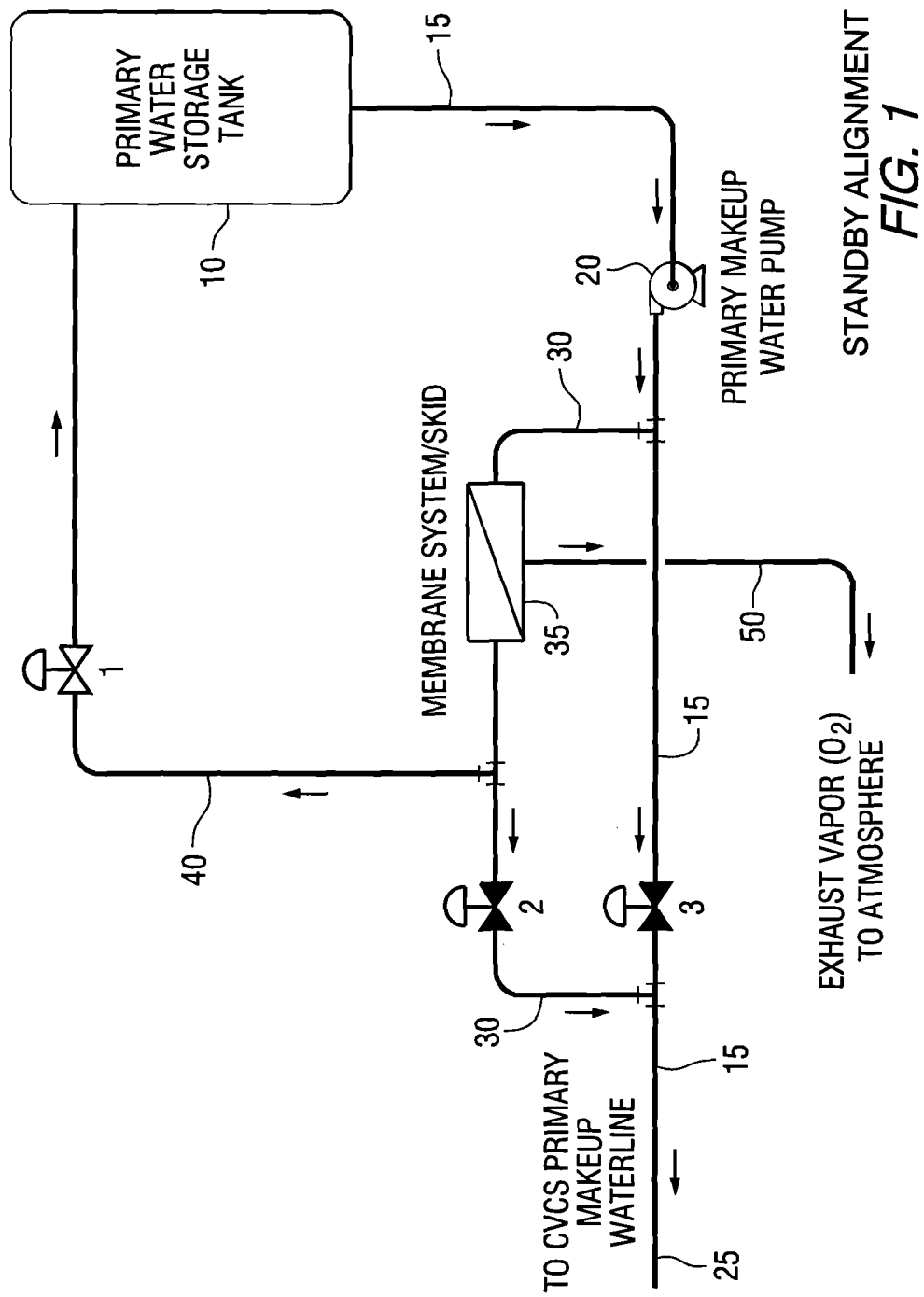
FIG. 1 is a schematic of a standby alignment of the Primary Makeup Water ("PMW") System in accordance with an embodiment of the present invention.

The present invention relates to a system and method for at least partially separating and removing dissolved gas from makeup water in a water-cooled nuclear reactor. The dissolved gas can include at least one gas contained in air, such as, oxygen, nitrogen, argon and mixtures thereof. The dissolved gas can be present in the makeup water as a result of air saturation. The makeup water is contained in a system configuration, such as, a Primary Makeup Water ("PMW") System and ultimately is supplied to an end-user, e.g., a component or system, within the water-cooled nuclear reactor. For example, the makeup water can be supplied from the PMW System and circulated in a Reactor Coolant System ("RCS"), whereby it is fed into a reactor core of the water-cooled nuclear reactor. In alternate embodiments, the makeup water can circulate through other systems and components of the nuclear reactor prior to being fed into the reactor core. The level or amount of dissolved gas in the makeup water can vary. In one embodiment, the percentage of dissolved gas in the makeup water can depend on the exposure of the makeup water to air and the resultant saturation of air in the makeup water; e.g., increased exposure and saturation results in a higher percentage of dissolved gas in the makeup water.

The PMW System includes a storage tank which contains and stores the makeup water. The makeup water includes demineralized water. Further, the makeup water optionally includes other chemicals, such as, but not limited to boron. In a PWR, for example, boron-containing water is circulated through the reactor to control the neutron flux within the core of the reactor. In one embodiment, demineralized water is supplied from a demineralized water feed tank and fed into an inlet of the storage tank of the PMW System. In a further embodiment, the demineralized water provided from the demineralized water feed tank includes boron. The amount of boron can vary depending on various parameters within the nuclear reactor and is not limiting to the invention. Typically, the amount of boron is within known ranges utilized in commercial water-cooled nuclear plants. The size, shape and material composition of the storage tank of the PMW System can vary and also is not limiting to the invention. The storage tank can include a cover, such as, but not limited to, a rubber bladder, and can include a nitrogen blanket. The makeup water is stored in the storage tank and contained within the PMW System until there is a need to provide makeup water to an end-user, e.g., other components and systems within the water-cooled nuclear reactor.

The PMW System is an auxiliary system that is used to support other systems in a water-cooled nuclear reactor. In one example, the PMW System can be connected to a Chemical and Volume Control System ("CVCS") which, in turn, can be connected to a RCS, and the RCS can deliver makeup water to the reactor core. Thus, makeup water in the storage tank of the PMW System can flow from the storage tank to the CVCS, to the RCS and ultimately into the reactor core of the water-cooled nuclear reactor. The storage tank can be connected to the CVCS using various pipes and fittings such that the makeup water exits through an outlet, or discharge, of the storage tank through piping which connects the storage tank to the CVCS (or other component or system in the water-cooled nuclear reactor). Within the piping, there can be various other components. For example, there can be a pump positioned downstream of the storage tank to pump the makeup water from the discharge of the storage tank through the PMW System, to an outlet, or discharge, of the PMW System and to an inlet of an end-user component or system, such as, for example, the CVCS, the RCS and the reactor core. Further, there can be a valve located downstream of the storage tank to control the flow of makeup water into the end-user component or system. The flow rate of makeup water can be increased or decreased by adjusting the opening of the valve. Further, the flow rate of makeup water into the end-user component or system can be prevented by completely closing the valve.

In the piping which connects the storage tank of the PMW System to the discharge of the PMW System (and the inlet of another component or system of the water-cooled nuclear reactor) is positioned a membrane system. The membrane system is capable to, at least partially, remove gas dissolved in the makeup water. As previously described, air can enter the storage tank in the PMW System containing the makeup water, and as a result, gas, such as oxygen, nitrogen, argon, and mixtures thereof, can dissolve in the makeup water. It is desired to reduce, minimize or eliminate, dissolved gas in the makeup water because the makeup water ultimately is fed into various systems and components of the water-cooled nuclear reactor, including the reactor core, and dissolved gas, such as dissolved oxygen, can be corrosive to the reactor components. In addition to dissolved oxygen, nitrogen can be dissolved in the makeup water as a result of saturation from air or the nitrogen blanket in the storage tank. Dissolved nitrogen can react to form carbon-14 as a result of absorbing neutrons in the reactor core and carbon-14 is a known environmental contaminant. Dissolved argon has similar undesirable effects as dissolved nitrogen and therefore, in addition to the removal of dissolved oxygen and dissolved nitrogen, it is also preferable to remove dissolved argon from the makeup water.

The membrane system suitable for use in the present invention can include a wide variety of membranes that are capable to, at least partially, separate and remove dissolved gas, such as, dissolved oxygen, dissolved nitrogen, dissolved argon and mixtures thereof, from a liquid stream, such as makeup water. The membrane system can remove various levels or amounts of dissolved gas from the makeup water. For example, in one embodiment, the membrane system is capable to remove essentially all of the dissolved gas from the makeup water, wherein the dissolved gas includes dissolved oxygen, dissolved nitrogen, dissolved argon and mixtures thereof. In another embodiment, the membrane system is capable to remove essentially all of the dissolved oxygen from the makeup water. The amount or percentage of removal can depend on various factors, such as, but not limited to the type and number of membranes in the membrane system. The specific design, e.g., size, shape and material composition, of the membrane system is not limiting to the present invention. Membranes suitable for use in the present invention can be selected from those known in the art. In one embodiment, liquid degassing membranes are used. In another embodiment, gas removal membranes are utilized which are commercially available as Liqui-Cel® membrane contactors. Furthermore, the number of membranes is not limiting to the present invention. In alternate embodiments, the membrane system can include one or a plurality of membranes. The membrane system includes an inlet and an outlet. Makeup water from the storage tank of the PMW System enters the membrane system, passes through the membrane(s) contained therein and exits through an outlet of the membrane system. The makeup water that is discharged from the outlet of the membrane system contains less dissolved gas than the makeup water that enters the inlet of the membrane system. Further, the dissolved gas, if any, remaining in the makeup water that is discharged from the outlet of the membrane system satisfies desired dissolved gas specifications, such as, the limits specified for commercial water-cooled nuclear reactors.

In one aspect, the system and method of the present invention remove dissolved gas from the makeup water stream after it has been discharged from the storage tank of the PMW System. Thus, the present invention treats the stream of makeup water (via the membrane system), and the level of dissolved gas in the stream is maintained within desired or acceptable limits, as opposed to treating the volume of makeup water contained in the storage tank such that the level of dissolved gas in the storage tank is maintained within desired or acceptable limits.

In one embodiment, upon exiting the membrane system, the makeup water can be recirculated back to the storage tank of the PMW System. In this embodiment, the PMW System is in a standby alignment which means that the PMW System is not activated and makeup water is not being discharged out of the PMW System to other components and systems in the water-cooled nuclear reactor, such as the CVCS, RCS and/or reactor core. This alignment can be employed, in one embodiment, when there is no situation or event occurring in the water-cooled nuclear reactor that requires makeup water to be supplied. In another embodiment, this alignment can be employed when initiating the start-up of the PMW System in response to an occurrence of an event in the water-cooled nuclear reactor that requires makeup water to be supplied. In this embodiment, e.g., start-up mode, the makeup water is recirculated within the PMW System, e.g., from the storage tank to the membrane system and back to the storage tank for a short period of time, after which time, the PMW System is then switched from start-up mode to supply or delivery mode.

In another embodiment, e.g., supply or delivery mode, the PMW System is activated and aligned such that makeup water is discharged from the storage tank through the membrane system, into an end-user component or system of the water-cooled nuclear reactor. This alignment can be employed following the startup mode (as described above) or without previously employing the startup mode. This supply/delivery alignment is operable to provide makeup water to various systems and components in the water-cooled nuclear reactor. In accordance with the present invention, the makeup water can be supplied on demand. That is, when a situation or event occurs in the water-cooled nuclear reactor which requires makeup water, the PMW System can be aligned and initiated to deliver the necessary makeup water to mitigate the situation or event. When there is no situation or event requiring makeup water, the PMW System can be in a non-supplying mode, such as, standby mode or simply a non-operational mode. Initiating and operating the system on an as-needed basis only, e.g., in response to a need, has various operational benefits including, but not limited to, (i) does not require continuous treatment of the PMW storage tank resulting in less wear-and-tear on the components of the PMW System and longer operational life of the components, and/or (ii) does not rely on the performance of dissolved gas exclusion provisions provided for the PMW storage tank.

In one embodiment, the PMW System is activated to supply makeup water for RCS boron dilution. RCS boron dilution is required to follow reactor core depletion in order to maintain full power. In this embodiment, boron-free makeup water is discharged from the primary water storage tank, passed through the membrane system to at least partially remove dissolved gases therein, discharged into the CVCS and ultimately fed into the RCS and circulation into the core of the water-cooled reactor.

The membrane system can be implemented in the PMW System using various configurations. The membrane system is positioned downstream of the storage tank and upstream of any outlet from the PMW System such that the makeup water passes through the membrane system to at least partially remove dissolved gas prior to entering an end-user component or system, such as, but not limited to, the CVCS, RCS, and reactor core. In one embodiment, the membrane system is positioned in a bypass line. The bypass line is connected to the discharge piping downstream of the storage tank (e.g., downstream of a makeup water pump), and the bypass line is connected back to the discharge piping upstream of the outlet of the PWM System and the inlet to the end-user component or system.

Figure 2:
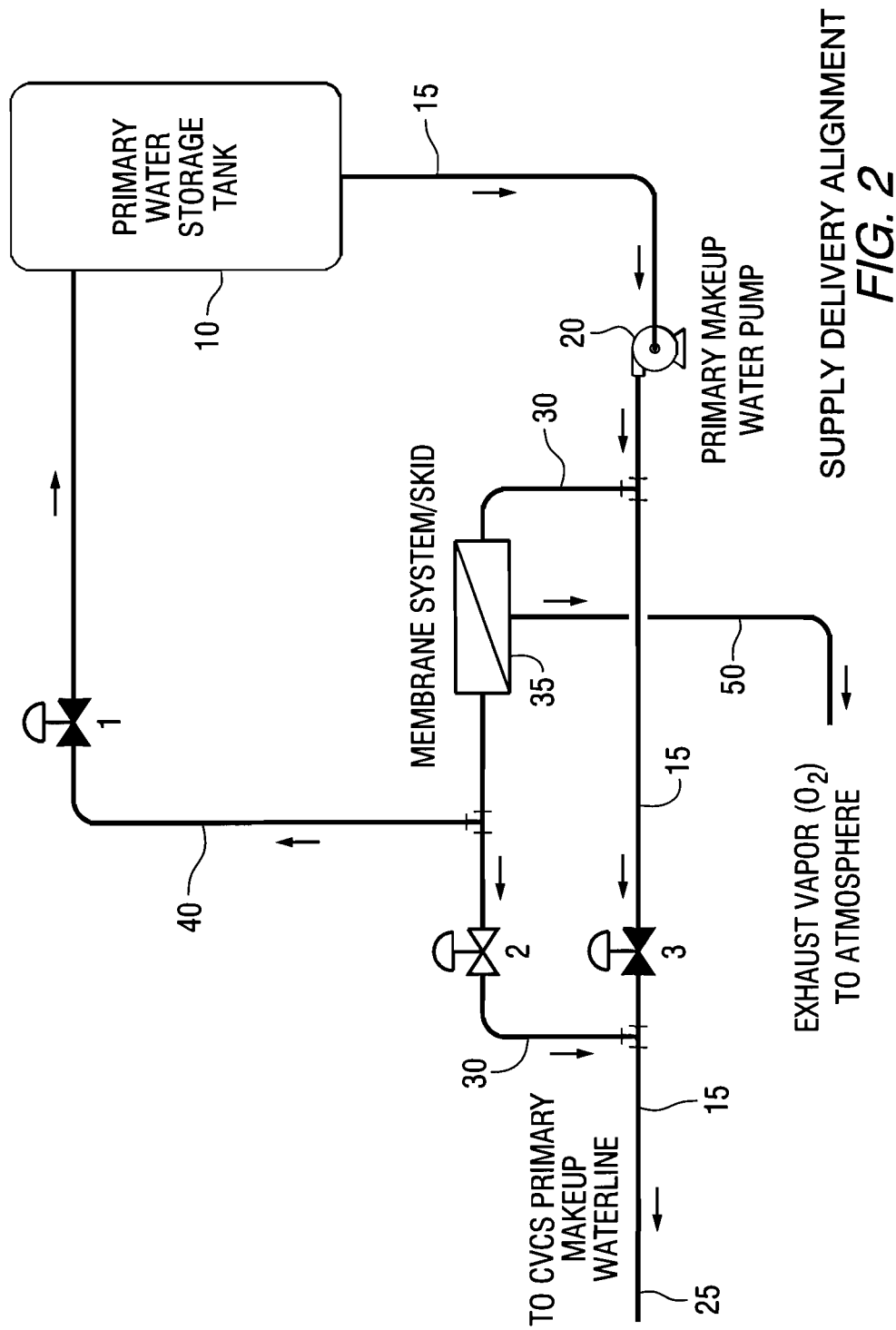
FIG. 2 is a schematic of an alignment of the Primary Makeup Water ("PMW") System for supplying makeup water to a Chemical and Volume Control System of a water-cooled nuclear reactor in accordance with another embodiment of the invention.

Two exemplary alignments of a PMW System of a water-cooled nuclear reactor in accordance with embodiments of the present invention are shown in FIGS. 1 and 2. In FIG. 1, the PMW System is shown in standby alignment. The PMW System includes a primary water storage tank 10 which contains and stores the makeup water. The makeup water can be fed from a demineralized water feed tank (not shown). The primary water storage tank 10 is connected by a discharge line 15 to a primary makeup water pump 20. Downstream of the pump 20, the discharge line 15 further includes a control valve 3 and an outlet 25 from the PMW System to the CVCS (not shown). In the standby alignment, the valve 3 is in its closed position to preclude the discharge of makeup water from the outlet 25 of the PMW System. Further, during standby mode, the makeup water is pumped to a bypass line 30 which is connected to the discharge line 15 (downstream of the pump 20). A membrane system 35 is positioned in the bypass line 30. The membrane system 35 can include one or more membranes (not shown) that are operable to at least partially separate and remove dissolved gas from the make water passing therethrough. The membrane system 35 includes a vent line 50 for venting vapor exhaust. Further positioned in the bypass line 30, downstream of the membrane system 35, is a control valve 2. The bypass line 30 then connects to the discharge line 15 downstream of the control valve 2. During the standby alignment, the valve 2 is in its closed position to prevent the flow of makeup water through the discharge line 15 and out of the PMW System. As shown in FIG. 1, downstream of the membrane system 35 and upstream of the control valve 2, a recirculation line 40 is connected to the bypass line 30. In the standby alignment, the recirculation line 40 transfers water from the outlet of the membrane system 35 back to an inlet of the primary water storage tank 10. A control valve 1 is positioned in the recirculation line 40. In the standby alignment, the control valve 1 is open to allow the water to flow from the primary water storage tank 10 through the membrane system 35 and back to the primary water storage tank 10.

FIG. 2 shows the PMW System of FIG. 1 with the exception that it is configured in an activated alignment to supply or deliver makeup water to components or systems in the water-cooled nuclear reactor. FIG. 2 includes the primary water storage tank 10, discharge line 15, pump 20, PMW System outlet 25, bypass line 30, membrane system 35, recirculation line 40, vent line 50 and valves 1, 2, 3, of FIG. 1. In FIG. 2, the control valve 1 is in its closed position to prevent the recirculation of makeup water from the primary water storage tank 10 through the membrane system 35 into the recirculation line 40 and back to the primary water storage tank 10. Further, the control valve 3 is in its closed position to preclude the flow of makeup water from the primary water storage tank 10 to the PMW System outlet 25 without the makeup water first flowing into the bypass line 30 and through the membrane system 35. In FIG. 2, the valve 2 is in its open position to allow the makeup water to flow from the primary water storage tank 10 through the discharge line 15, through the pump 20, into the bypass line 30, through the membrane system 35, back into the bypass line 30, into the discharge line 15, through the outlet 25 of the PMW System into the inlet of the CVCS.

The system and method of the present invention provide for at least one of the following benefits. The PMW System can be employed on an as-needed basis and is available on-demand. When makeup water is needed by an end-user component or system, the PMW System can be started-up and configured in accordance with FIG. 1 alignment and then switched or changed to the FIG. 2 activated alignment. Or, the PMW System can be maintained in the FIG. 1 alignment (e.g., standby) and when makeup water is needed, the alignment can be switched to the FIG. 2 alignment. In accordance with the present invention, it is not necessary to introduce chemicals into the makeup water in order to remove the dissolved gases contained therein. Further, it is not necessary to maintain the dissolved gas exclusion provisions provided for the primary water storage tank, or any pretreatment of the primary water storage tank, within specified dissolved gas limits as the present invention employs an in-line system and an on-demand method of treating a makeup water stream after it is discharged from the storage tank.

Whereas particular embodiments of the invention have been described herein for purposes of illustration, it will be evident to those skilled in the art that numerous variations of the details may be made without departing from the invention as set forth in the appended claims.

What is claimed is:

1. A treatment system for at least partially removing dissolved gas from makeup water in a primary makeup water system in a water-cooled nuclear reactor, the primary makeup water system, comprising:
a storage tank having a discharge, said storage tank containing the makeup water including the dissolved gas;
a discharge line having a first end and a second end, the first end connected to the discharge of the storage tank; and
the treatment system, comprising:
a membrane system having an inlet and an outlet, said membrane system positioned downstream of the discharge of the storage tank,
wherein the discharge line transports a stream of the makeup water including dissolved gas from the discharge of the storage tank through the inlet of the membrane system to at least partially remove the dissolved gas from the stream of the makeup water to produce a stream of treated makeup water from the outlet of the membrane system; and
a transport mechanism to transfer the stream of treated makeup water from the outlet of the membrane system into the water-cooled nuclear reactor.

2. The system of claim 1, wherein the dissolved gas comprises at least one dissolved gas selected from the group consisting of dissolved oxygen, dissolved nitrogen, dissolved argon and mixtures thereof.

3. The system of claim 1, wherein the dissolved gas is present in the makeup water as a result of air saturation.

4. The system of claim 1, wherein the system further comprises a pump positioned downstream of the discharge of the storage tank and upstream of the inlet of the membrane system.

5. The system of claim 1, wherein the system further comprises a valve located downstream of the outlet of the membrane system.

6. The system of claim 1, wherein the makeup water is substantially boron-free.

7. The system of claim 1, wherein the dissolved gas comprises dissolved oxygen.

8. The system of claim 1, wherein the membrane system removes essentially all of the dissolved gas from the stream of makeup water.

9. The system of claim 7, wherein the membrane system removes essentially all of the dissolved oxygen from the stream of makeup water.

10. The system of claim 1, wherein the membrane system comprises a plurality of membranes.

11. The system of claim 10, wherein the plurality of membranes comprises liquid degassing membranes.

12. The system of claim 1, wherein the system is activated on demand in response to an occurrence of an event in the water-cooled nuclear reactor requiring a supply of the stream of treated makeup water.

13. The system of claim 1, wherein the system is maintained in a standby alignment and changed to an activated alignment in response to an occurrence of an event in the water-cooled nuclear reactor requiring the stream of treated makeup water.

14. The system of claim 1, wherein the transport mechanism transfers the stream of treated makeup water from the outlet of the membrane system to the core of the water-cooled nuclear reactor.

15. A treatment method for at least partially removing dissolved gas from makeup water in a primary makeup water system in a water-cooled nuclear reactor, the method comprising:
providing a storage tank to contain the makeup water including the dissolved gas;
discharging a stream of the makeup water from an outlet of the storage tank to an inlet of a membrane system;
passing the stream of the makeup water through the membrane system;
at least partially removing the dissolved gas from the stream of the makeup water in the membrane system to produce a stream of treated makeup water; and
transporting the stream of treated makeup water from an outlet of the membrane system to an end-user selected from the group consisting of components and/or systems in the water-cooled nuclear reactor.

16. The method of claim 15, wherein the method is activated on demand in response to an occurrence of an event in the water-cooled nuclear reactor requiring a supply of the stream of treated makeup water.

17. The method of claim 15, wherein the method operates in a standby alignment and changed to an activated alignment in response to an occurrence of an event in the water-cooled nuclear reactor requiring the stream of treated makeup water.

18. The method of claim 15, wherein the stream of treated makeup water is transported from the outlet of the membrane system to the core of the water-cooled nuclear reactor.

* * * * *